Sept. 21, 1926.
L. C. FEIGHTNER
ROLLER BEARING
Filed Dec. 8, 1922
1,600,463
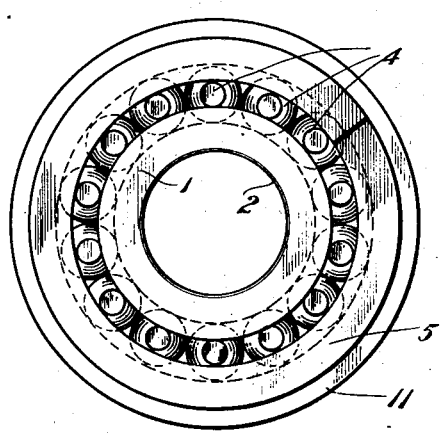
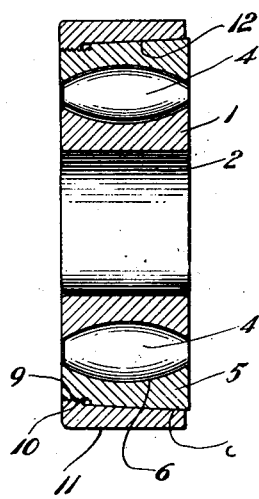
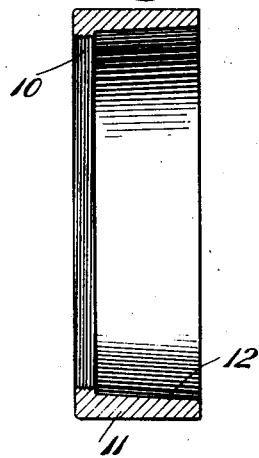
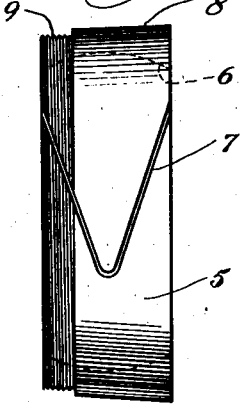
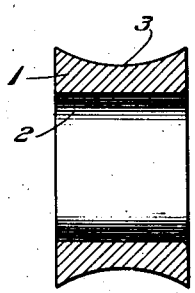
Inventor
Lewis C. Feightner
By Frease and Bond
Attorneys.

Patented Sept. 21, 1926.

1,600,463

UNITED STATES PATENT OFFICE.

LEWIS C. FEIGHTNER, OF CANTON, OHIO.

ROLLER BEARING.

Application filed December 8, 1922. Serial No. 605,616.

This invention relates to roller bearings and more particularly to a bearing adapted to receive end thrust in both directions.

The objects of the invention are to provide a roller bearing which will take the end thrust in both directions to provide a bearing of this character including barrel shaped or double tapered rollers and an adjustable outer race for retaining the rollers; and to generally improve and simplify roller bearings.

The above and other objects may be attained by constructing a roller bearing adapted for barrel shaped or double tapered rollers and comprising an inner race having an annularly concaved outer surface to accommodate the rollers, a split outer race having a similar concaved inner surface and a tapered outer surface, and an adjusting and retaining ring having a tapered inner surface for engagement therewith, whereby the rollers may be inserted and retained in the bearing as a unit.

A practical embodiment of the invention is illustrated in the accompanying drawing, in which—

Figure 1 is an end elevation of a roller bearing embodying the invention;

Fig. 2, a longitudinal, sectional view through the same;

Fig. 3, a longitudinal, sectional view through the inner race;

Fig. 4, a side elevation of the outer race;

Fig. 5, a longitudinal, sectional view through the adjusting and retaining ring; and Fig. 6, an elevation of one of the barrel shaped rollers.

Similar numerals of reference refer to similar parts throughout the drawing.

The inner race 1 may be provided with the usual central bore 2 for the reception of an axle or the like, and is provided with the peripheral curved groove 3 shaped to conform to the barrel shaped rollers 4, such as are shown in Figs. 2 and 6.

The outer race 5 is formed of spring steel and is provided upon its inner surface with the peripheral groove 6 corresponding to the shape of the rollers 4 and is split, preferably in the form of a V, as best shown at 7 in Fig. 4.

The peripheral surface of the outer race 5 is frusto-conical, as shown at 8, threads 9 being provided at the smaller end thereof for engagement with the internal threads 10 of the adjusting and retaining ring 11, the inner surface of which is tapered as indicated at 12, to correspond with the taper 8 upon the outer race.

In assembling the bearing, the outer race is placed around the inner race and a number of rollers are inserted between the races. In order to insert the last few rollers, the split outer race is expanded, and after all of the rollers have been placed in the bearing, the outer race is permitted to contract to its normal position, retaining the rollers in place between the inner and outer races.

The adjusting and retaining ring 11 is then placed in position around the outer race, the threads 10 thereon engaging the threads 9 upon the outer race and as said ring is tightened, the conical inner surface 12 thereof bearing against the conical outer surface 8 of the outer race, contracts the same upon the rollers.

The outer race can thus be easily and quickly adjusted to the rollers and in case of wear, a slight turn of the ring 11 will properly adjust the outer race 5 to take up for the wear.

It will be seen that when the bearing is assembled, the rollers will be self-contained and the whole bearing held together as a unit, the outer race retaining the rollers and being adjustable to accommodate the rollers by means of the adjusting and retaining ring.

I claim:—

1. A roller bearing including an inner race having a grooved periphery extending across its entire width, a split outer race having a grooved inner surface and a tapered periphery, rollers conforming to the grooves in said races and an adjusting ring provided with a tapered inner surface surrounding the outer race and threaded upon one end portion of the outer race.

2. A roller bearing including an inner race having a grooved periphery extending across its entire width, an outer race provided with a V shaped slit and having a grooved inner surface and a tapered periphery, barrel shaped rollers conforming to the grooves in said races and an adjusting ring provided with a tapered inner surface surrounding the outer race and threaded upon one end portion of the outer race.

In testimony that I claim the above, I have hereunto subscribed my name.

LEWIS C. FEIGHTNER.